United States Patent
Masuda

(10) Patent No.: US 9,094,671 B2
(45) Date of Patent: *Jul. 28, 2015

(54) IMAGE PROCESSING DEVICE, METHOD, AND RECORDING MEDIUM THEREFOR

(71) Applicant: FUJIFILM Corporation, Tokyo (JP)

(72) Inventor: Tomonori Masuda, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/280,138

(22) Filed: May 16, 2014

(65) Prior Publication Data

US 2014/0247327 A1 Sep. 4, 2014

Related U.S. Application Data

(63) Continuation of application No. PCT/JP2012/078933, filed on Nov. 8, 2012.

(30) Foreign Application Priority Data

Dec. 19, 2011 (JP) .................................. 2011-277352

(51) Int. Cl.
*H04N 13/02* (2006.01)
*H04N 13/00* (2006.01)
*G03B 35/10* (2006.01)

(52) U.S. Cl.
CPC ............ *H04N 13/0203* (2013.01); *G03B 35/10* (2013.01); *H04N 13/0022* (2013.01); *H04N 13/0239* (2013.01); *H04N 13/0296* (2013.01); *H04N 2013/0081* (2013.01)

(58) Field of Classification Search
CPC .......... H04N 13/0022; H04N 13/0239; H04N 13/0203; H04N 13/0296; H04N 2013/0081; G03B 35/10
USPC .......................................................... 348/46
See application file for complete search history.

(56) References Cited

U.S. PATENT DOCUMENTS 4,086,585 A * 4/1978 Wah Lo et al. ................. 396/327
4,852,972 A * 8/1989 Wah Lo .......................... 359/463

(Continued)

FOREIGN PATENT DOCUMENTS

EP 2618584 A1 * 7/2013 ............. H04N 13/02
JP 6-28452 A 2/1994

(Continued)

OTHER PUBLICATIONS

International Preliminary Report on Patentability, issued in PCT/JP2012/078933, dated Sep. 3, 2013.

(Continued)

*Primary Examiner* — Shan Elahi
(74) *Attorney, Agent, or Firm* — Birch, Stewart, Kolasch & Birch, LLP

(57) ABSTRACT

An image processing device comprising a representative parallax acquisition unit, a scene separation unit to separate the stereoscopic video into multiple scenes when a parallax width does not comply with an allowable parallax width, a parallax adjustment unit to decide whether a scene parallax width complies with the allowable parallax width, and uniformly adjust the representative parallaxes for the respective stereoscopic image frames constituting the scene such that the scene parallax width complies with the allowable parallax width, the scene parallax width being defined by a maximum value and a minimum value of the representative parallaxes for the respective stereoscopic image frames constituting the scene, and an output unit, wherein the representative parallaxes for the respective stereoscopic image frames include a statistical operation value to be calculated based on parallaxes that, of parallaxes for the stereoscopic image frames, meet a predetermined condition.

15 Claims, 9 Drawing Sheets

(56) References Cited

U.S. PATENT DOCUMENTS

| | | | |
|---|---|---|---|
| 5,337,096 A * | 8/1994 | Qu et al. | 353/7 |
| 6,590,573 B1 * | 7/2003 | Geshwind | 345/419 |
| 8,723,919 B2 * | 5/2014 | Seong | 348/42 |
| 8,937,644 B2 * | 1/2015 | Tin | 348/46 |
| 2003/0214662 A1 * | 11/2003 | Mochizuki et al. | 358/1.9 |
| 2010/0097444 A1 * | 4/2010 | Lablans | 348/46 |
| 2010/0225743 A1 * | 9/2010 | Florencio et al. | 348/46 |
| 2010/0238272 A1 * | 9/2010 | Cameron et al. | 348/47 |
| 2011/0122233 A1 * | 5/2011 | Kasai et al. | 348/49 |
| 2011/0234760 A1 * | 9/2011 | Yang et al. | 348/46 |
| 2011/0242093 A1 * | 10/2011 | Jung et al. | 345/419 |
| 2011/0254925 A1 | 10/2011 | Ushiki et al. | |
| 2012/0120055 A1 * | 5/2012 | Seong | 345/419 |
| 2012/0140043 A1 | 6/2012 | Mori | |
| 2012/0147205 A1 * | 6/2012 | Lelescu et al. | 348/218.1 |
| 2012/0154554 A1 * | 6/2012 | Ootuki et al. | 348/51 |
| 2013/0002656 A1 * | 1/2013 | Zhang | 345/419 |
| 2013/0250062 A1 * | 9/2013 | Tin | 348/46 |

FOREIGN PATENT DOCUMENTS

| | | |
|---|---|---|
| JP | 8-327948 A | 12/1996 |
| JP | 9-238369 A | 9/1997 |
| JP | 2004-221699 A | 8/2004 |
| JP | 2011-109408 A | 6/2011 |
| JP | 2011-223482 A | 11/2011 |
| WO | WO 2010/111040 A1 | 9/2010 |
| WO | WO 2011/121818 A1 | 10/2011 |

OTHER PUBLICATIONS

International Search Report, issued in PCT/JP2012/078933, dated Feb. 5, 2013.

Written Opinion of the International Searching Authority, issued in PCT/JP2012/078933, dated Feb. 5, 2013.

* cited by examiner

IMAGE PROCESSING DEVICE, METHOD, AND RECORDING MEDIUM THEREFOR

CROSS-REFERENCE TO RELATED APPLICATIONS

This application is a Continuation of PCT International Application No. PCT/JP2012/078933 filed on Nov. 8, 2012, which claims priority under 35 U.S.C §119(a) to Japanese Patent Application No. 2011-277352 filed on Dec. 19, 2011. Each of the above application(s) is hereby expressly incorporated by reference, in its entirety, into the present application.

BACKGROUND OF THE INVENTION

1. Field of the Invention

The present invention relates to image processing, and particularly to an adjustment of a binocular parallax for each stereoscopic image frame of a stereoscopic video.

2. Description of the Related Art

A stereoscopic image processing device in Japanese Patent Application Laid-Open No. 2004-221699 (hereinafter referred to as PTL 1), when a displayed subject reaches a limit parallax, generates parallax images in accordance with acquired adequate parallax information, such that the adequate parallax is implemented in subsequent stereoscopic display. The control of the parallax is implemented by going back to three-dimensional data and optimally setting a camera parameter. Here, a two-dimensional image generation unit of the stereoscopic image processing device calculates a depth Fxy that meets the adequate parallax. When the range of the depth is K1 to K2 and the depth value of each pixel is Gxy, $Fxy=J1+(Gxy-K1)\times(J2-J1)/(K2-K1)$ holds. In the case where Fxy is not an integer, a rounding or a process for decreasing an approximation parallax is performed.

A three-dimensional image processing device in Japanese Patent Application Laid-Open No. 6-028452 (hereinafter referred to as PTL 2) provides an observation viewpoint sensor to detect an observation viewpoint of a facing observer, on a display device to display a three-dimensional image shown in perspective by a viewpoint coordinate system, and a computer moves the viewpoint coordinate system of the display image, in tune with the observation viewpoint detected by the observation viewpoint sensor. Thereby, the perspective viewpoint of the three-dimensional image to be displayed on the display device is moved so as to follow the observation viewpoint of the observer, and the image display is performed such that the perspective viewpoint always accords with the observation viewpoint.

A three-dimensional image display device in Japanese Patent Application Laid-Open No. 9-238369 (hereinafter referred to as PTL 3) includes a viewpoint detection device to detect a viewpoint position of an observer, a picture generation device to generate two pictures having a parallax for the left and right eyes, a picture display device to display the two pictures for individually projecting them, and a picture projection device to individually project the two displayed pictures to the left and right eyes of the observer. The picture generation device generates pictures that reflect the change in an observation direction for an observation object corresponding to the movement of the viewpoint of the observer, based on output signals of the viewpoint detection device. Furthermore, the picture generation device generates pictures of an imaginary body that reflect the change in the observation direction for the observation object corresponding to the movement of the viewpoint of the observer, and that have a parallax for the left and right eyes of the observer, based on output signals of the viewpoint detection device.

A stereoscopic image display method in Japanese Patent Application Laid-Open No. 8-327948 (hereinafter referred to as PTL 4), by a configuration that includes a display unit to provide a liquid crystal shutter in front of a display device and dispose a lenticular lens in front of the liquid crystal shutter, and a control unit to which a viewpoint position of an observer is input, displays a parallax image corresponding to the right eye and left eye on the display device by time division, and synchronously with the parallax image, changes the width and position of a light-transmitting part of the liquid crystal shutter in response to the viewpoint position of the observer, allowing the parallax image to be observed by a corresponding eye through the lenticular lens.

SUMMARY OF THE INVENTION

It may occur that a stereoscopic video using a parallax induces fatigue of a viewer if it is not displayed by an appropriate parallax amount. The appropriate parallax amount varies depending on the size of a display device for displaying, the stereoscopic fusion limit of a viewer, and the like. Therefore, it is necessary to perform a parallax adjustment corresponding to them.

When the stereoscopic image, as a result of the parallax adjustment, is played back by a parallax different from a parallax at the time of taking the image, it may occur that a viewer has an uncomfortable feeling. Therefore, it is desirable to perform the parallax adjustment so as to keep the original parallax at the time of taking the stereoscopic image as much as possible.

In PTL 1, a depth Fxy meeting an adequate parallax is calculated and rounded off. Therefore, it may occur that the parallaxes between frames become equivalent and a change in stereoscopic effect involved in a frame transition cannot be sensed, or conversely, that the parallaxes change too much between frames, leading to fatigue of a viewer.

The present invention has an object to prevent an original parallax from being considerably impaired by the parallax adjustment of a stereoscopic video.

The present invention provides an image processing device including: a representative parallax acquisition unit to acquire a representative parallax for each of multiple stereoscopic image frames constituting a whole or predetermined partial range of a stereoscopic video; a scene separation unit to separate the stereoscopic video into multiple scenes, when a parallax width does not comply with an allowable parallax width, the parallax width being defined by a maximum value and a minimum value of the representative parallax for each stereoscopic image frame acquired by the representative parallax acquisition unit, and the allowable parallax width being defined by a previously determined maximum allowable parallax and a minimum allowable parallax; a parallax adjustment unit to decide whether a scene parallax width complies with the allowable parallax width, for each of the scenes separated by the scene separation unit, and, in response to the decision result, uniformly adjust the representative parallax for each stereoscopic image frame constituting the scene such that the scene parallax width complies with the allowable parallax width, the scene parallax width being defined by a maximum value and a minimum value of the representative parallax for the stereoscopic image frame constituting the scene; and an output unit to output the stereoscopic image frame whose representative parallax is adjusted by the parallax adjustment unit, in which the representative parallax for each stereoscopic image frame includes a statistical operation value to be calculated based on parallaxes that, of parallaxes for the stereoscopic image frame, meet a predetermined condition.

When the scene parallax width for a certain scene complies with the allowable parallax width but the maximum value of the representative parallax for the stereoscopic image frame constituting the scene is higher than a previously determined upper limit of the representative parallax, the parallax adjustment unit adjusts the representative parallax for each stereoscopic image frame constituting the scene such that the representative parallax falls below the upper limit of the representative parallax.

When each scene parallax width corresponding to two or more successive scenes complies with the allowable parallax width but the maximum value of the representative parallax for the stereoscopic image frame constituting the two or more successive scenes is higher than the upper limit of the representative parallax, the parallax adjustment unit uniformly adjusts the representative parallax for each stereoscopic image frame constituting the two or more successive scenes such that the representative parallax falls below the upper limit of the representative parallax.

When the scene parallax width for a certain scene complies with the allowable parallax width but the minimum value of the representative parallax for the stereoscopic image frame constituting the scene falls below a previously determined lower limit of the representative parallax, the parallax adjustment unit adjusts the representative parallax for each stereoscopic image frame constituting the scene such that the representative parallax is higher than the lower limit of the representative parallax.

When each scene parallax width corresponding to two or more successive scenes complies with the allowable parallax width but the minimum value of the representative parallax for the stereoscopic image frame constituting the two or more successive scenes falls below the lower limit of the representative parallax, the parallax adjustment unit uniformly adjusts the representative parallax for each stereoscopic image frame constituting the two or more successive scenes such that the representative parallax is higher than the lower limit of the representative parallax.

When the scene parallax width for a scene separated in accordance with a first predetermined criterion does not comply with the allowable parallax width, the scene separation unit separates the stereoscopic video in accordance with the first predetermined criterion and a second criterion that is different from the first predetermined criterion.

The second criterion has a lower estimation accuracy for a change in the scene than first criterion.

For each of the scenes separated in accordance with the first criterion and the second criterion by the scene separation unit, the parallax adjustment unit decides whether the scene parallax width for the scene complies with the allowable parallax width, and adjusts the representative parallax for each stereoscopic image frame constituting the scene such that the scene parallax width complies with the allowable parallax width, when deciding that the scene parallax width for the scene does not comply with the allowable parallax width.

When a difference of adjustment amounts of the representative parallaxes between two contiguous scenes exceeds a predetermined threshold value, the parallax adjustment unit performs a smoothing of the adjustment amounts of the representative parallaxes between the two contiguous scenes.

Preferably, the statistical operation value includes at least one of an average value, a maximum value, a minimum value, a mode value and a median value of the parallaxes for the stereoscopic image frame.

Preferably, the representative parallax for each stereoscopic image frame includes at least one of an average value, a maximum value, a minimum value, a mode value and a median value of parallaxes for a subject present on a background side or parallaxes for a subject present on a foreground side, among the parallaxes for the stereoscopic image frame, the background side being a side in a direction farther from an imaging device than a cross point, and the foreground side being a side in a direction closer to the imaging device than the cross point.

Preferably, the parallaxes that meet the predetermined condition should include a parallax for a gazing position to the stereoscopic image frame.

Preferably, the gazing position includes a gazing point of a viewer of the stereoscopic image frame, a gazing point of a videographer of the stereoscopic image frame, or an arbitrary designated gazing point in the stereoscopic image frame.

Preferably, the parallaxes that meet the predetermined condition includes parallaxes for a face area, parallaxes for a focusing evaluation value calculation area, parallaxes for a central image area, parallaxes for a subject present on a background side among the parallaxes for the stereoscopic image frame, or parallaxes for a subject present on a foreground side among the parallaxes for the stereoscopic image frame. The background side is a side in a direction farther from an imaging device than a cross point, and the foreground side is a side in a direction closer to the imaging device than the cross point.

Preferably, the representative parallax for each stereoscopic image frame includes both a first representative parallax, which is a maximum value of the parallaxes that are of the parallaxes for the stereoscopic image frame and that meet the predetermined condition, and a second representative parallax, which is a minimum value of the parallaxes that, of the parallaxes for the stereoscopic image frame, meet the predetermined condition, and the scene separation unit separates the stereoscopic video into the multiple scenes, when the parallax width defined by the maximum value of the first representative parallax and the minimum value of the second representative parallax does not comply with the allowable parallax width defined by the previously determined maximum allowable parallax and the minimum allowable parallax.

The present invention provides an image processing method to be executed in an image processing device including a representative parallax acquisition unit, a scene separation unit, a parallax adjustment unit and an output unit, the image processing method including: a step of acquiring by the representative parallax acquisition unit a representative parallax for each of multiple stereoscopic image frames constituting a whole or predetermined partial range of a stereoscopic video; a step of separating by the scene separation unit the stereoscopic video into multiple scenes, when a parallax width does not comply with an allowable parallax width, the parallax width being defined by a maximum value and a minimum value of the representative parallax for each stereoscopic image frame acquired by the representative parallax acquisition unit, and the allowable parallax width being defined by a previously determined maximum allowable parallax and a minimum allowable parallax; a step of deciding by the parallax adjustment unit whether a scene parallax width complies with the allowable parallax width, for each of the scenes separated by the scene separation unit, and, in response to the decision result, uniformly adjusting the representative parallax for each stereoscopic image frame constituting the scene such that the scene parallax width complies with the allowable parallax width, the scene parallax width being defined by a maximum value and a minimum value of the representative parallax for the stereoscopic image frame constituting the scene; and a step of outputting by the output unit the stereoscopic image frame whose representative parallax is adjusted by the parallax adjustment unit, in which the representative parallax for each stereoscopic image frame includes a statistical operation value to be calculated based on parallaxes that, of parallaxes for the stereoscopic image frame, meet a predetermined condition.

The present invention provides an image processing program to be executed in an image processing device including a representative parallax acquisition unit, a scene separation unit, a parallax adjustment unit and an output unit, the image processing program comprising: a step of acquiring by the representative parallax acquisition unit a representative parallax for each of multiple stereoscopic image frames constituting a whole or predetermined partial range of a stereoscopic video; a step of separating by the scene separation unit the stereoscopic video into multiple scenes, when a parallax width does not comply with an allowable parallax width, the parallax width being defined by a maximum value and a minimum value of the representative parallax for each stereoscopic image frame acquired by the representative parallax acquisition unit, and the allowable parallax width being defined by a previously determined maximum allowable parallax and a minimum allowable parallax; a step of deciding by the parallax adjustment unit whether a scene parallax width complies with the allowable parallax width, for each of the scenes separated by the scene separation unit, and, in response to the decision result, uniformly adjusting the representative parallax for each stereoscopic image frame constituting the scene such that the scene parallax width complies with the allowable parallax width, the scene parallax width being defined by a maximum value and a minimum value of the representative parallax for the stereoscopic image frame constituting the scene; and a step of outputting by the output unit the stereoscopic image frame whose representative parallax is adjusted by the parallax adjustment unit, in which the representative parallax for each stereoscopic image frame includes a statistical operation value to be calculated based on parallaxes that, of parallaxes for the stereoscopic image frame, meet a predetermined condition. Furthermore, the present invention provides a non-transitory computer-readable recording medium having the image processing program recorded therein.

When the parallax width for a stereoscopic video does not comply with an output-allowable parallax width, the present invention separates the stereoscopic video into multiple scenes, decides whether the parallax width for each scene complies with the output-allowable parallax width, and adjusts the representative parallaxes for the scene in response to the decision result. The parallax width for the whole stereoscopic video is not uniformly adjusted, but the parallax width is adjusted for each scene. Therefore, it is possible to prevent the stereoscopic effect of the stereoscopic video from being lost as a whole.

DETAILED DESCRIPTION OF THE PREFERRED EMBODIMENTS

Figure 1:
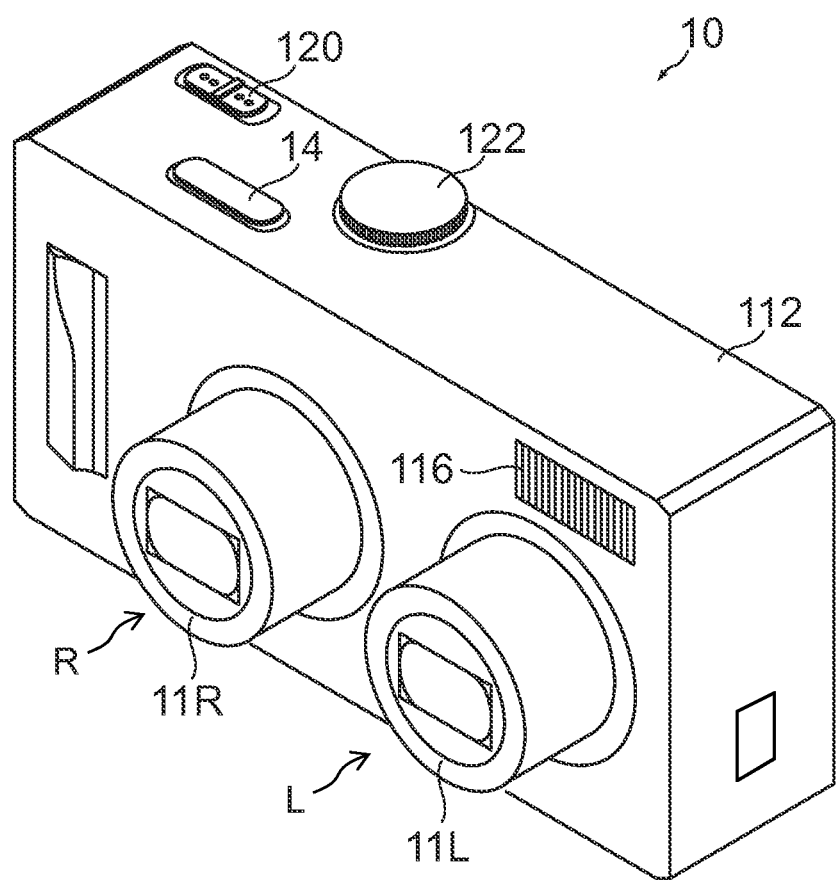
FIG. 1 is a front perspective diagram of a digital camera.
Figure 2:
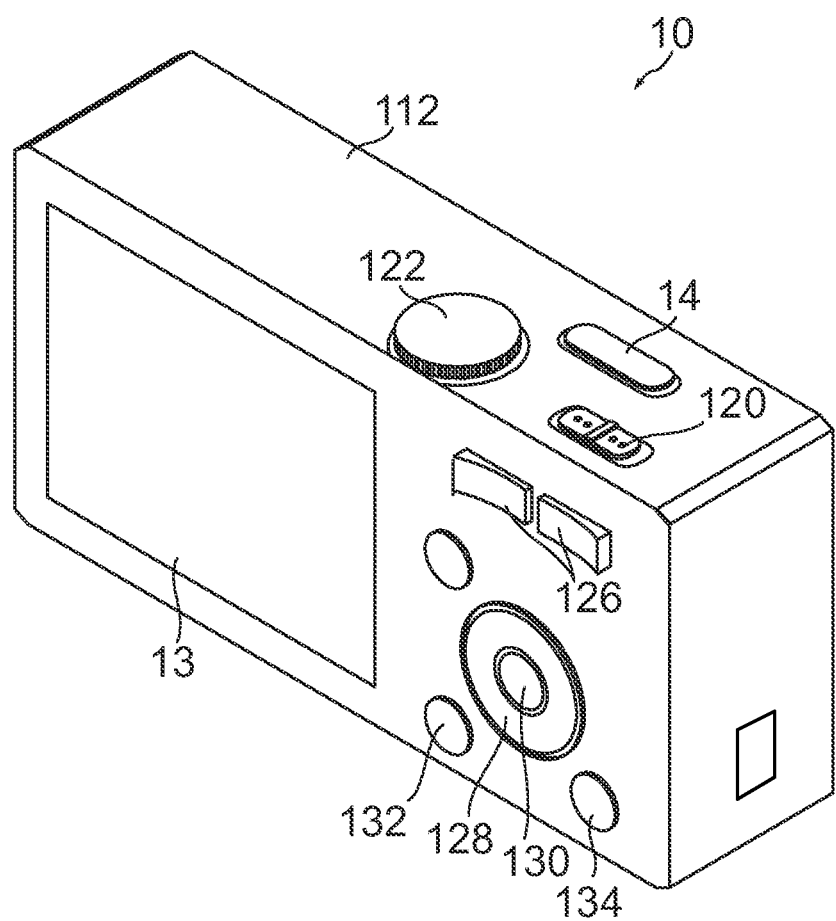
FIG. 2 is a back perspective diagram of the digital camera.

FIG. 1 is a front perspective diagram showing the appearance configuration of a digital camera 10 that is an embodiment of the present invention. FIG. 2 is a back perspective diagram showing an example of the appearance configuration of the digital camera.

The digital camera 10 includes multiple sets of imaging means (FIG. 1 illustrates two sets.), and allows for an image taking for an identical subject from multiple viewpoints (FIG. 1 illustrates two right and left viewpoints). Here, in the embodiment, the case including two sets of imaging means is explained as an example, for the convenience of explanation. However, the present invention is not limited to this, and the case of including three or more sets of imaging means is applicable similarly.

A camera body 112 of the digital camera 10 according the embodiment is formed in a rectangular box shape, and as shown in FIG. 1, is provided with a pair of image-taking optical systems 11R, 11L and a strobe 116 on the front surface. Furthermore, on the top surface of the camera body 112, a release button 14, a power/mode switch 120, a mode dial 122 and the like are provided. Furthermore, on the back surface of the camera body 112, as shown in FIG. 2, a monitor 13 configured by a liquid crystal display device (LCD) and the like, a zoom button 126, a cross button 128, a MENU/OK button 130, a DISP button 132, a BACK button 134 and the like are provided. The monitor 13 may be incorporated in the digital camera 10, or may be an external device.

The pair of right and left image-taking optical systems 11R, 11L is configured to include collapsible zoom lenses (18R, 18L in FIG. 3), respectively, and they are extended from the camera body 112 when the power of the digital camera 10 is turned ON. The zoom mechanism and collapsing mechanism in the image-taking optical system are known technologies, and therefore the concrete explanation is omitted here.

The monitor 13 is a display device such as a color liquid crystal panel in which a so-called lenticular lens having half-cylindrical lenses is disposed on the anterior surface. This monitor 13 is utilized as an image display unit for displaying an image after image-taking, and is utilized as a GUI for a variety of setting. Furthermore, it is utilized as an electronic finder, which displays a live-view image picked up by an imaging element at the time of image taking. Here, the stereoscopic image display technique of the monitor 13 is not limited to a parallax barrier technique. For example, it may be a stereoscopic image display technique utilizing glasses, such as an anaglyph technique, a polarizing filter technique or a liquid crystal shutter technique.

The release button 14 is configured as a two-step stroke-type switch that allows for a so-called "half-push" and "full-push". When a still image is taken (when a still image taking mode is selected through the mode dial 122 or a menu), the digital camera 10, once the half-push of the release button 14 is performed, performs an image-taking preparation process, that is, each process of AE (Automatic Exposure), AF (Auto Focus) and AWB (Automatic White Balance), and once the full push is performed, it performs an image taking and recording process. When a stereoscopic video is taken (when a stereoscopic video taking mode is selected through the mode dial 122 or the menu), once the full push of the release button 14 is performed, the stereoscopic video taking starts, and once the full push is performed again, the image taking finishes. Here, it may be set such that the stereoscopic video taking is performed while the full push of the release button 14 is performed, and the image taking finishes once the full push is released. Furthermore, a dedicated release button for taking a still image and a dedicated release button for taking a stereoscopic video may be provided.

The power/mode switch 120 (power switch and mode switch) functions as a power switch of the digital camera 10, and functions as switching means to switch between a playback mode and an image taking mode of the digital camera 10. The mode dial 122 is used for the setting in the image taking mode. The digital camera 10 is set to a 2D still image taking mode for taking a 2D still image, by setting the mode dial 122 to a "2D still image position", and is set to a 3D still image taking mode for taking a 3D still image, by setting the mode dial 122 to a "3D still image position". Furthermore, the digital camera 10 is set to a 3D video taking mode for taking a 3D video, by setting the mode dial 122 to a "3D video position".

The zoom button 126 is used for the zoom operation of the image-taking optical systems 11R, 11L, and is configured by a zoom-tele button for instructing a zoom to the telescopic side and a zoom-wide button for instructing a zoom to the wide side. The cross button 128 is provided such that the pressing operation can be performed in four directions: rightward, leftward, upward and downward, and functions depending on the setting state of the camera are assigned to the pressing operations in the respective directions. The MENU/OK button 130 is used for calling a menu screen (MENU function), and is used for the determination of a selected content, the instruction of a process execution, and the like (OK function). The DISP button 132 is used for inputting a switching instruction for the display content on the monitor 13, and the like, and the BACK button 134 is used for inputting an instruction such as a cancel of an input operation.

Figure 3:
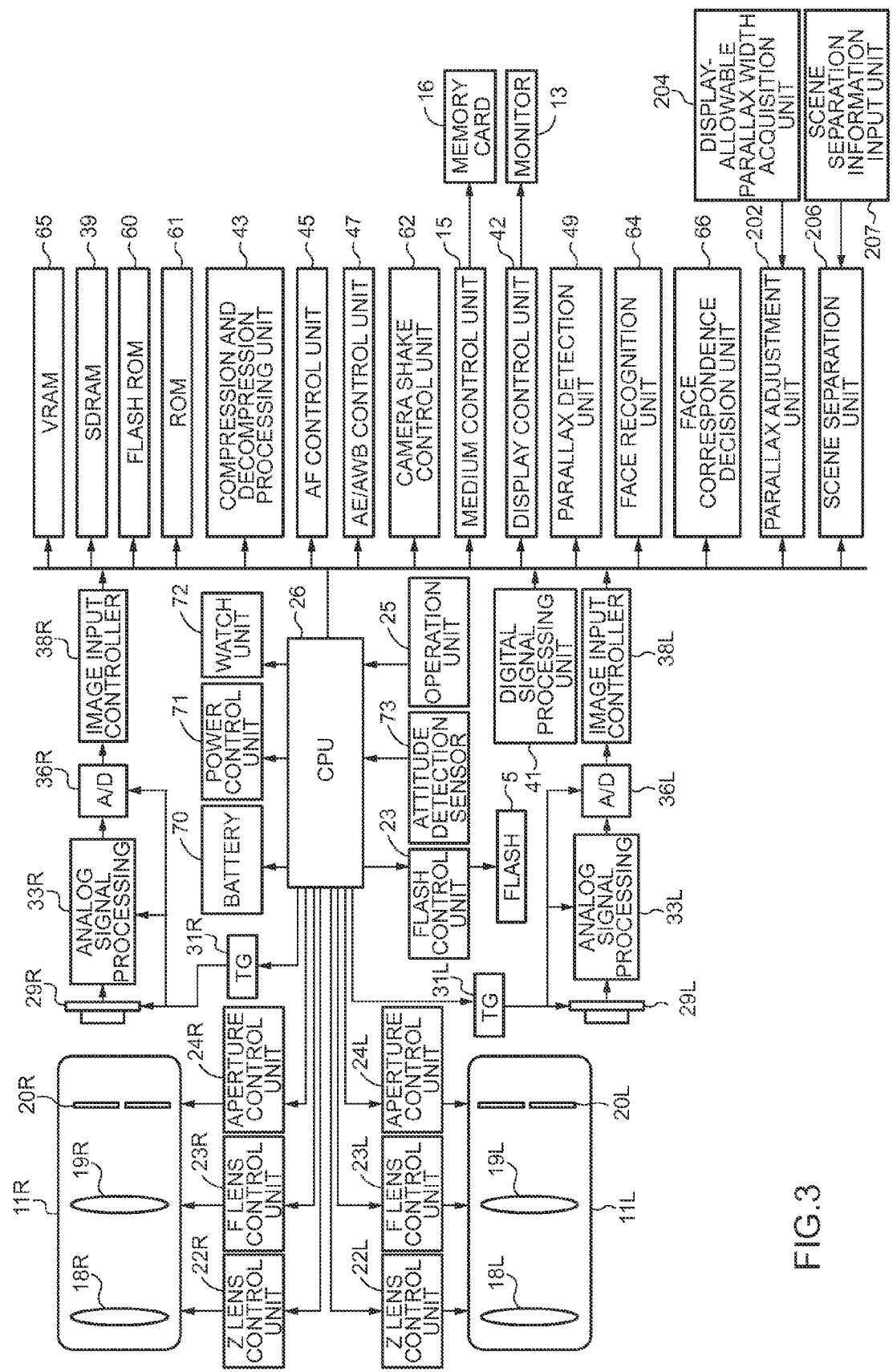
FIG. 3 is a block diagram of the digital camera.

FIG. 3 is a block diagram showing the principal part of the digital camera 10.

The digital camera 10 includes imaging means for the right viewpoint that has the image-taking optical system 11R and an imaging element 29R for the right viewpoint, and imaging means for the left viewpoint that has the image-taking optical system 11L and an imaging element 29L for the left viewpoint.

The two image-taking optical systems 11 (11R, 11L) each include zoom lenses 18 (18R, 18L), focus lenses 19 (19R, 19L), and apertures 20 (20R, 20L). These zoom lenses 18, focus lenses 19 and apertures 20 are driven by zoom lens control units 22 (22R, 22L), focus lens control units 23 (23R, 23L) and aperture control units 24 (24R, 24L), respectively. The respective control units 22, 23, 24 include stepping motors, and are controlled by drive pulses to be given from motor drivers not shown in the figure, which are connected with a CPU 26.

Behind the two image-taking optical systems 11 (11R, 11L), CCD image sensors (hereinafter, simply referred to as "CCDs") 29 (29R, 29L) are each disposed. Here, MOS-type image sensors may be used instead of the CCDs 29. As is well known, the CCDs 29 include photoelectric conversion surfaces on each of which multiple photoelectric conversion elements are arrayed, and subject light is entered to the photoelectric conversion surfaces through the image-taking optical systems 11 so that subject images are formed. The CCDs 29 are connected with timing generators: TGs 31 (31R, 31L) that are controlled by the CPU 26, and by timing signals (clock pulses) to be input from the TGs 31, the shutter speeds of electronic shutters (the charge accumulation time in each photoelectric conversion element) are determined.

The imaging signals output from the CCDs 29 are input to analog signal processing circuits 33 (33R, 33L). The analog signal processing circuits 33 include correlated double sampling circuits (CDSs), amplifiers (AMPs) and the like. The CDSs generate image data of R, G and B corresponding to the charge accumulation time for each pixel, from the imaging signals. The AMPs amplify the generated image data.

The AMPs function as sensitivity regulation means to regulate the sensitivities of the CCDs 29. The ISO sensitivities of the CCDs 29 are determined by the gains of the AMPs. A/D converters 36 (36R, 36L) convert the amplified image data from analog to digital. The digital image data output from the A/D converters 36 (36R, 36L), through image input controllers 38 (38R, 38L), are temporarily stored in an SDRAM 39, which is a working memory, as image data for the right viewpoint and image data for the left viewpoint, respectively.

A digital signal processing unit 41 reads the image data from the SDRAM 39, performs various image processes such as a gradation conversion, a white balance correction, a γ correction process and a YC conversion process, and stores the image data in the SDRAM 39 again. The image data after the image processing by the digital signal processing unit 41 are acquired by a VRAM 65 as a through image, and thereafter, are converted into analog signals for picture output by a display control unit 42, to be displayed on the monitor 13. The image data after the image processing that are acquired following the full-push of the release button 14 are compressed in a predetermined compression format (for example, the JPEG format) by a compression and decompression processing unit 43, and thereafter, through a medium control unit 15, are recorded in a memory card 16 as recording image.

An operation unit 25, by which various operations for the digital camera 10 are performed, is configured by the various buttons and switches 120 to 134 shown in FIG. 1 and FIG. 2.

The CPU 26 is provided for integrally controlling the digital camera 10. The CPU 26 controls the respective units such as a battery 70, a power control unit 71 and a watch unit 72, based on various control programs and setting information stored in non-transitory computer-readable recording media such a flash ROM 60 and a ROM 61, input signals from an attitude detection sensor 73 and the operation unit 25, and the like.

Furthermore, the digital camera 10 is provided with an AE/AWB control unit 47 to perform an AE (Auto Exposure)/AWB (Auto White Balance) control, and a parallax detection unit 49 to detect a representative parallax for each of multiple stereoscopic image frames. Furthermore, the digital camera 10 includes a flash control unit 23 to control the emission timing and emission amount of a flash 5.

When the half-push of the release button 14 is performed, the AE/AWB control unit 47 analyzes images (pickup images) obtained by the CCDs 29, and calculates the aperture values of the apertures 20 and the shutter speeds of the electronic shutters of the CCDs 29, based on the luminance information of a subject and the like. Then, based on these calculation results, the AE/AWB control unit 47 controls the aperture values through the aperture control units 24, and controls the shutter speeds through TGs 31.

For example, based on a pickup image (right viewpoint image or left viewpoint image) obtained by the CCD 29R or CCD 29L of one image-taking optical system of the two image-taking optical systems 11R, 11L, the aperture values and shutter speeds of both image-taking optical systems 11R, 11L are calculated. Based on pickup images (right viewpoint image and left viewpoint image) obtained by both image-taking optical systems 11R and 11L, the respective aperture values and shutter speeds of the image-taking optical systems 11R, 11L may be calculated.

When the half-push of the release button 14 is performed, an AF control unit 45 performs an AF search control of moving the focus lenses 19R, 19L in the optical axis direction and calculating the contrast value, and performs a focusing control of moving the focus lenses 19R, 19L to the focusing lens positions based on the contrast value. Here, the "contrast value" is calculated based on image signals in predetermined focusing evaluation value calculation areas of pickup images obtained by the CCDs 29R, 29L. The "focusing lens positions" are positions of the focus lenses 19R, 19L where the focus lenses 19R, 19L are focused on at least a main subject.

For example, while at least one of the focus lenses 19R, 19L of the two image-taking optical systems 11R, 11L is moved by the focus lens control unit 23R or 23L, the contrast value is calculated from a pickup image (right viewpoint image or left viewpoint image) by one of the image-taking optical systems 11R and 11L. Based on the contrast value, the focusing lens positions of the focus lenses 19R, 19L of the two image-taking optical systems 11R, 11L are determined respectively, and by the drive of the respective focus lens control units 23R and 23L, the focus lenses 19R, 19L are moved to the respective focusing lens positions. The respective focusing lens positions may be determined by performing the AF search with both image-taking optical systems 11R, 11L, respectively.

The attitude detection sensor 73 detects the rotation directions and angles of the image-taking optical systems 11R, 11L relative to previously determined attitudes.

A camera shake control unit 62 drives, with motors, correction lenses not shown in the figure which are provided in the image-taking optical systems 11R, 11L, and thereby, corrects optical axis gaps detected by the attitude detection sensor 73 to prevent camera shake.

The CPU 26 controls a face recognition unit 64 such that a face recognition is performed from the right and left image data corresponding to the subject images in the image-taking optical systems 11R, 11L. In response to the control of the CPU 26, the face recognition unit 64 starts a face recognition, and performs the face recognition from each of the right and left image data. The face recognition unit 64 stores, in the SDRAM 39, the face area information containing the position information of face areas, which are respectively recognized from the right and left image data as a result of the face recognition. By a known method such as template matching, the face recognition unit 64 can recognize the face area from the images stored in the SDRAM 39. Here, examples of the face area of a subject include the face area of a person or animal in a pickup image.

A face correspondence decision unit 66 decides the correspondence relation between the face area recognized from the right image data and the face area recognized from the left image data. That is, the face correspondence decision unit 66 identifies a pair of face areas, for which the pieces of position information of the face areas respectively recognized from the right and left image data are closest to each other. Then, the face correspondence decision unit 66 performs the matching of the image information between the face areas constituting the pair, and decides that the face areas constituting the pair have a correspondence relation to each other, when the accuracy of both the identity exceeds a predetermined threshold value.

The parallax detection unit 49 calculates a representative parallax between predetermined areas of the right and left image data. The predetermined area can include a partial area or whole area of an image. Furthermore, the predetermined area can include a face area detected by a known face detection, a face area matching a face area of a particular person that is arbitrarily registered, a gazing point of an observer of the monitor 13 or a videographer, a gazing point or subject area of a stereoscopic video in the display surface of the monitor 13 that is arbitrarily designated through a user interface such as the operation unit 25, a vicinity area of a gazing point, or the like. When there is a single observer for the monitor 13, the gazing point of the observer can be detected by a known gazing point detection such as PTLs 2 to 4. When there are multiple observers for the monitor 13, a known gazing point detection is applied to an observer meeting a particular condition, for example, the closest observer to the monitor 13, and thereby, the gazing point can be detected. The gazing point of a videographer may be a whole or part of a subject area that is designated at the time of image taking or at another timing. The gazing point detection may be performed by the digital camera 10, or may be performed by another device, for example, an external display device such as a television or a head-mount display.

For example, the representative parallax is calculated as follows. First, the parallax detection unit 49 calculates a position difference (corresponding-point distance) between particular points (corresponding points) that correspond between face areas constituting a pair. Then, the parallax detection unit 49 calculates the average value of the parallaxes for the points contained in the pair of face areas, and this is determined as the representative parallax for the pair. When multiple face areas are decided as having correspondence relations, the parallax detection unit 49 calculates the representative parallax only for a main face area of those face areas, and stores the representative parallax for the main face area in the SDRAM 39. The main face area is a face area closest to the center of the screen, a face area closest to the focusing evaluation value calculation area, a face area having the largest size, or the like.

Alternatively, the parallax detection unit 49 makes a parallax histogram from the parallaxes for the corresponding points in a predetermined area (for example, a partial area such as a face area, or the whole area) of the right and left image data. The class is arbitrary. Then, the class value of a class having the highest frequency, that is, the mode value may be determined as the representative parallax for the predetermined area.

Alternatively, the parallax detection unit 49 selects the maximum parallax value or minimum parallax value from the parallaxes for the corresponding points in a predetermined area of the right and left image data, and may determine the maximum parallax value or minimum parallax value as the representative parallax for the predetermined area. Here, when the predetermined area is a single point such as a gazing point, the representative parallax is the maximum parallax value and the minimum parallax value for the gazing point.

Alternatively, the parallax detection unit 49 may determine the median value of the parallaxes for the corresponding points in a predetermined area of the right and left image data, as the representative parallax for the predetermined area.

Alternatively, the parallax detection unit 49 may determine the average value of the parallaxes for the corresponding points in a predetermined area of the right and left image data, as the representative parallax for the predetermined area.

Other than the above, the representative parallax can be calculated by various statistical operations. Here, values that do not meet a predetermined condition may be excluded from sample values of the parallaxes to be used for calculating the representative parallax. For example, the parallaxes for the corresponding points in an area where the sharpness (spatial frequency) of the image is lower than a predetermined reference value (a so-called defocus area), the parallaxes exceeding a predetermined limit value, and the like may be excluded from the sample values of the parallaxes to be used for calculating the representative parallax, and the representative parallax may be calculated from the parallaxes for the corresponding points in an area meeting the predetermined condition. The condition may be determined based on image-taking conditions such as the zoom factors of the image-taking optical systems 11R, 11L. This is because the parallax for an identical corresponding point is magnified or demagnified in response to a magnification or demagnification of the zoom factor. Alternatively, there may be no predetermined exclusion condition (no condition).

Alternatively, using the above statistical operations, the parallax detection unit 49 may calculate the representative parallax, from the parallaxes for a subject positioned on the far side (background side), which is a side in the direction farther from the digital camera 10 than a cross point of the right and left image data, or on the near side (foreground side), which is aside in the direction closer to the digital camera 10. Here, the cross point is a convergent point at which the optical axis of the image-taking optical system 11R and the optical axis of the image-taking optical system 11L intersect on the image-taking symmetry plane.

Furthermore, the representative parallax may be calculated for different frames or over different scenes, by a common statistical operation expression, or multiple kinds of representative parallaxes may be calculated from an identical frame by multiple statistical operation expressions.

For example, the maximum value of the parallaxes for one arbitrary frame F is determined as a first representative parallax, and the minimum value of the parallaxes for the frame F is determined as a second representative parallax. Thus, multiple kinds of representative parallaxes may be determined from one frame.

Alternatively, as for the representative parallax for each frame constituting a background scene X, using the above statistical operations, the representative parallax may be calculated from the parallaxes for the corresponding points of a subject that is positioned on the far side (background side) relative to the cross point. Then, as for the representative parallax for each frame constituting a foreground scene Y, using the above statistical operations, the representative parallax may be calculated from the parallaxes for the corresponding points of a subject that is positioned on the near side (foreground side) relative to the cross point. For example, for one arbitrary frame, the maximum value of the parallaxes for the corresponding points on the background side relative to the cross point can be determined as a first representative parallax, and the maximum value of the parallaxes for the corresponding points on the foreground side relative to the cross point can be determined as a second representative parallax.

Alternatively, the maximum value of the parallaxes for the corresponding points on the background side relative to the cross point can be determined as a first representative parallax, the maximum value of the parallaxes for the corresponding points on the foreground side relative to the cross point can be determined as a second representative parallax, the minimum value of the parallaxes for the corresponding points on the background side relative to the cross point can be determined as a third representative parallax, and the minimum value of the parallaxes for the corresponding points on the foreground side relative to the cross point can be determined as a forth representative parallax.

Alternatively, the maximum value of all the parallaxes for an arbitrary frame contained in an identical scene can be determined as a first parallax, and the minimum value of all the parallaxes can be determined as a second parallax.

That is, only a single kind of representative parallax may be determined by a single statistical operation, or multiple kinds of representative parallaxes may be determined by multiple different statistical operations.

Alternatively, the parallax detection unit 49 calculates the average value of the parallaxes between the corresponding points in predetermined areas that have a correspondence relation between the right and left images, for example, the center areas of the images or focusing evaluation value calculation areas, and determines it as the representative parallax for the pair.

The position information and representative parallax for predetermined areas that have a correspondence relation are stored in the SDRAM 39 while being associated with the right and left image data. For example, the position information and representative parallax for face areas that have a correspondence relation are stored as the supplementary information (header, tag, meta-information or the like) of the image data. In the case where the image data is compressed and recorded in the memory card 16 as recording images, the position information and representative parallax for the face areas are recorded together in the supplementary information of the recording images, as the tag information such as Exif, for example.

A display-allowable parallax width acquisition unit 204 acquires a minimum display-allowable parallax Dmin and a maximum display-allowable parallax Dmax, and inputs them to a parallax adjustment unit 202. The mode of the acquisition is arbitrary, and they may be input from the operation unit 25, may be input from the ROM 61, the supplementary information of stereoscopic video data, or the like, or may be input from the monitor 13 as control information.

Figure 4:
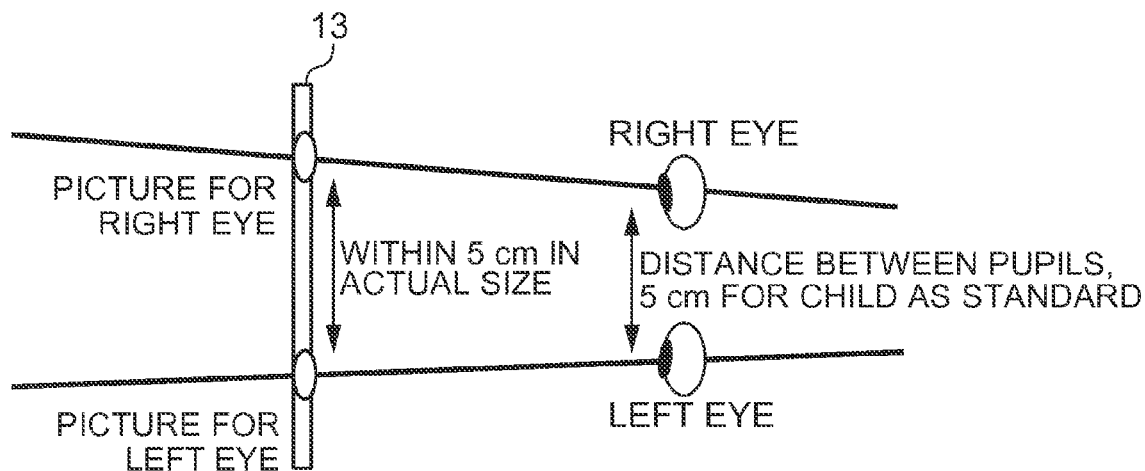
FIG. 4 is a schematic diagram of a parallax limit in the divergence direction.

The maximum display-allowable parallax Dmax defines the limit of the parallax in the divergence direction (in the direction in which the stereoscopic image on the monitor 13 goes backward). As illustrated in the (a) portion of FIG. 4, since human eyes do not spread outward, right and left images having a parallax beyond the distance between the pupils do not fuse, and a viewer cannot recognize them as one image, causing eyestrain. Considering a child viewer, the distance between the pupils is about 5 cm, and therefore, the number of pixels of the monitor 13 corresponding to the distance is the maximum display-allowable parallax Dmax. For example, when the monitor 13 is a high-vision television having a size of 16:9 inches and the resolution is 1920×1080, the maximum display-allowable parallax Dmax for each size of the monitor 13 is as shown in the (b) portion of FIG. 4. In the case where the size of the monitor 13 is small as a built-in screen of a digital camera or mobile phone, the parallax in the divergence direction hardly becomes a problem, but in the case of the monitor 13 having a large-size display surface as a television, the parallax in the divergence direction becomes a problem.

The minimum display-allowable parallax Dmin defines the limit of the excessive parallax (in the direction in which the stereoscopic image on the monitor 13 goes forward). Unlike the maximum display-allowable parallax Dmax, the minimum display-allowable parallax Dmin cannot be uniquely determined from the distance between the pupils. As output conditions for determining the minimum display-allowable parallax Dmin, for example, there are (1) the size of the monitor 13, (2) the resolution of the monitor 13, (3) the viewing distance (the distance from a viewer to the monitor 13), and (4) the individual stereoscopic fusion limit of a viewer.

As a standard example, (2) the resolution of the monitor 13 of a high-vision television is 1920×1080, and (3) the viewing distance is three times the screen height of the monitor 13. Assuming these, (4) a general stereoscopic fusion limit is 57 pixels (a parallax angle of about 1 degree). A threshold value setting unit 205 may input the information of (1) to (4) from the exterior, based on a user operation, the setting information of the monitor 13, or the like. For example, a user can input the resolution of the monitor 13 that the user is viewing, the viewing distance, the stereoscopic fusion limit, through the operation unit 25. However, when (2) to (4) are not particularly input from the exterior, the threshold value setting unit 205 reads the above typical example from the ROM 61 or the like, and then input it to the parallax adjustment unit 202.

The parallax adjustment unit 202 adjusts the width of the representative parallaxes for the right and left image data such that it falls within the display-allowable parallax width ranging from the minimum display-allowable parallax Dmin to the maximum display-allowable parallax Dmax.

Figure 5:
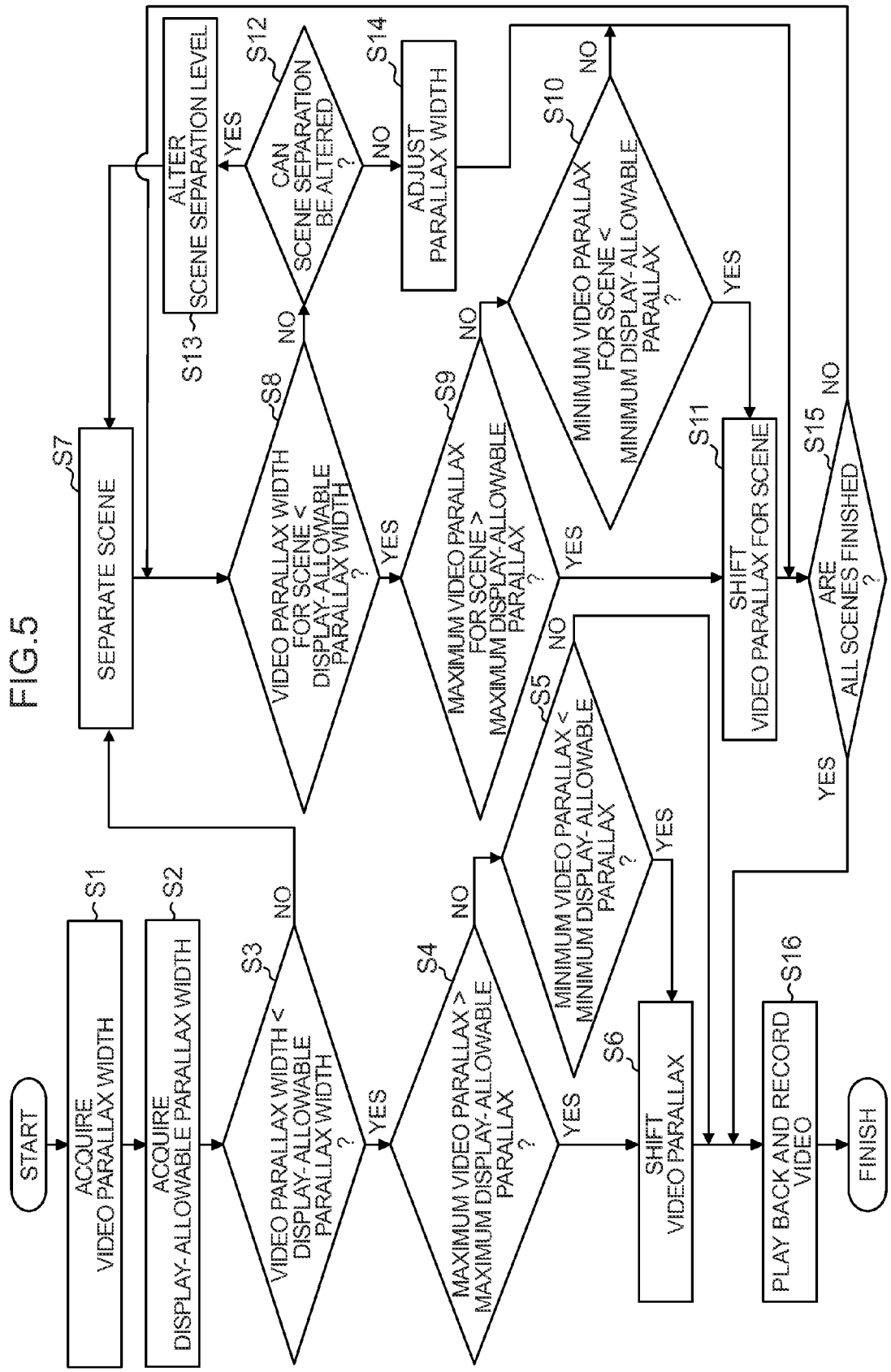
FIG. 5 is a flowchart of a parallax adjustment process.

FIG. 5 is a flowchart showing the parallax adjustment process. This process is controlled by the CPU 26. A program making the CPU 26 execute this process is stored in a computer-readable recording medium such as the ROM 61. This process is executed after the position information and representative parallax for the above areas are stored in the supplementary information of image data.

In S1, the parallax adjustment unit 202 attempts reading the representative parallax for each stereoscopic image frame, from the right and left image data of each stereoscopic image frame constituting a whole or predetermined partial range of a stereoscopic video and the supplementary information of the stereoscopic video that are stored in the SDRAM 39 or the memory card 16. The predetermined partial range of the stereoscopic video may be designated through the operation unit 25, or may be defined in the ROM 61 or the like. Also, the units of the position and length of the range are arbitrary, and can be designated by a frame number, an image-taking time, a time interval, the number of frames and the like.

In S2, the display-allowable parallax width acquisition unit 204 acquires the display-allowable parallax width to the SDRAM 39. The display-allowable parallax width is the range from the minimum display-allowable parallax Dmin to the maximum display-allowable parallax Dmax. The acquisition source of the display-allowable parallax width includes the operation unit 25, the built-in ROM 61, the external monitor 13, electronic devices and the like.

In S3, the parallax adjustment unit 202 specifies the maximum value pmax of the representative parallax and the minimum value pmin of the representative parallax, from the representative parallax for each stereoscopic image, and calculates a stereoscopic video parallax width by using pmax−pmin. Then, the parallax adjustment unit 202 decides whether the stereoscopic video parallax width<the display-allowable parallax width holds. In the case of Yes, the process proceeds to S4, and in the case of No, the process proceeds to S7.

Here, when the representative parallax is calculated by multiple operation expressions and multiple kinds of representative parallaxes are present, the maximum value of all kinds of the representative parallaxes is specified as pmax, and the minimum value of all kinds of the representative parallaxes is specified as pmin. Then, the stereoscopic video parallax width is calculated by using pmax−pmin.

In particular, when the maximum value maxk of the parallaxes for each frame Fk is a first kind of the representative parallax and the minimum value mink of the parallaxes for each frame Fk is a second kind of the representative parallax, pmax is the maximum value MAX of the maximum value of the parallaxes for each frame Fk (maxk) and pmin is the minimum value MIN of the minimum value of the parallaxes for each frame Fk (mink).

In S4, the parallax adjustment unit 202 decides whether the maximum value pmax of the representative parallax>the maximum display-allowable parallax Dmax holds. In the case of Yes, the process proceeds to S6, and in the case of No, the process proceeds to S5.

In S5, the parallax adjustment unit 202 decides whether the minimum value pmin of the representative parallax<the minimum display-allowable parallax Dmin holds. In the case of Yes, the process proceeds to S6, and in the case of No, the process proceeds to S16.

In S6, the parallax adjustment unit 202 shifts the representative parallax for each stereoscopic image frame such that the stereoscopic video parallax width falls within the display-allowable parallax width. That is, in the case where the decision of Yes has been made in S4, each representative parallax is shifted in the negative (down) direction such that each representative parallax falls within the range of Dmax to Dmin. In the case where the decision of Yes has been made in S5, each representative parallax is shifted in the positive (up) direction such that each representative parallax falls within the range of Dmax to Dmin.

In S7, a scene separation unit 206 detects a change in the scene of the stereoscopic image frames. The level of the scene detection by the scene separation unit 206 can be altered. Here, the level of the scene detection can be altered in stages among Levels 1 to 3. The initial detection level at the first-time execution of S7 is Level 1, and the scene change is detected at the initial detection level until the level is altered in S13 described later. The estimation accuracy of the detection of the scene change decreases in the order of Level 1>Level 2>Level 3.

The detection method of the scene change differs depending on the level. At Level 1, in which the estimation accuracy of the detection of the scene change is highest, the scene change is detected based on an explicit user operation of designating a breakpoint of the scene, which is input from the operation unit 25 or the like. For example, a stereoscopic image frame that has been designated as a breakpoint of the scene by an editing operation is detected as a stereoscopic image frame at which the scene changes. The editing operation includes the designation of a cutting point of a stereoscopic image frame in a stereoscopic video, the designation of a connecting point of different stereoscopic videos, and the like. Also, a stereoscopic image frame at which the release button 14 has been turned on or off can be detected as a stereoscopic image frame at which the scene changes.

At Level 2, in which the estimation accuracy of the detection is lower than Level 1, a stereoscopic image frame acquired at the time point of a factor changing operation of the zoom lens 18 by the zoom button 126 is detected as a stereoscopic image frame at which the scene changes.

At Level 3, in which the estimation accuracy of the detection is lower than Level 2, when the difference in the image information between two contiguous stereoscopic image frames a, b exceeds a predetermined threshold value, the stereoscopic image frame b is detected as a stereoscopic image frame at which the scene changes. This image information includes luminance information, color information, the statically processed information (histogram and the like) of that information, and the like.

The scene detection methods corresponding to the levels may be freely set by a user through a scene separation information input unit 207. The scene separation information input unit 207 and the operation unit 25 may have common means.

The scene separation unit 206 separates the stereoscopic video into n (n=2, 3 . . . ) sections on the basis of stereoscopic image frames at which scene changes are detected. By breaking the stereoscopic video at the stereoscopic image frames at which scene changes are detected, the sections of the separated stereoscopic video constitute different scenes, respectively. The scene separation unit 206 inputs, to the parallax adjustment unit 202, the scene information indicating the first stereoscopic image frame and last stereoscopic image frame of each scene S(k). Here, k is 1 to n, and the initial value of k is 1. The value of k is incremented by 1 whenever the loop of S7 to S15 is repeated.

In S8, the parallax adjustment unit 202 specifies the maximum value pmax(k) of the representative parallax and the minimum value pmin(k), from the representative parallax for each stereoscopic video frame in the scene S(k) discriminated in accordance with the scene information, and calculates the stereoscopic video parallax width for the scene S(k) by using pmax (k)−pmin (k). Then, the parallax adjustment unit 202 decides whether the stereoscopic video parallax width for the scene S(k)<the display-allowable parallax width holds. In the case of Yes, the process proceeds to S9, and in the case of No, the process proceeds to S12.

In S9, the parallax adjustment unit 202 decides whether the maximum value pmax(k) of the representative parallax for the scene S(k)>the maximum display-allowable parallax Dmax holds. In the case of Yes, the process proceeds to S11, and in the case of No, the process proceeds to S10.

In S10, the parallax adjustment unit 202 decides whether the minimum value pmin of the representative parallax for the scene S(k)<the minimum display-allowable parallax Dmin holds. In the case of Yes, the process proceeds to S11, and in the case of No, the process proceeds to S15.

In S11, the parallax adjustment unit 202 shifts the representative parallax for each stereoscopic image frame in the scene S(k), in the positive or negative direction, such that the representative parallaxes for the scene S(k) fall within the range of Dmax to Dmin.

In S12, the scene separation unit 206 decides whether it is possible to set a scene detection method by a lower separation level than the currently-set scene separation level. For example, in the case where the scene detection level can be altered among Level 1 to 3 as described above, the decision of Yes is made if the currently-set level is Level 1 or 2, and the decision of No is made if the currently-set level is Level 3.

In S13, the scene separation unit 206 alters the scene separation level. For example, the scene separation unit 206 sets a level in which the estimation accuracy is lower by one stage than the current level, as a new detection level. Thereafter, the process returns to S7, and the detection of the scene change in the stereoscopic video is performed at the new detection level. Alternatively, the detection of the scene change may be performed at both of the previously-set level and the lately-set level.

In S14, the parallax adjustment unit 202 adjusts the representative parallax for each stereoscopic image frame in the scene S(k) such that the stereoscopic video parallax width for the scene S(k) falls within the display-allowable parallax width. For example, the representative parallax for each stereoscopic image frame in the scene S(k) is uniformly reduced by a reduction ratio of (X−Y)/X, when the stereoscopic video parallax width for the scene S(k) is X, the display-allowable parallax width is Y, and X>Y holds.

In S15, the CPU 26 decides whether k=n holds, that is, whether the loop of S7 to S15 has been executed for all the scenes S(1) to S(n). In the case of Yes, the process proceeds to S16. In the case of No, the value of k is incremented by 1, and the process returns to S8.

Figure 6:
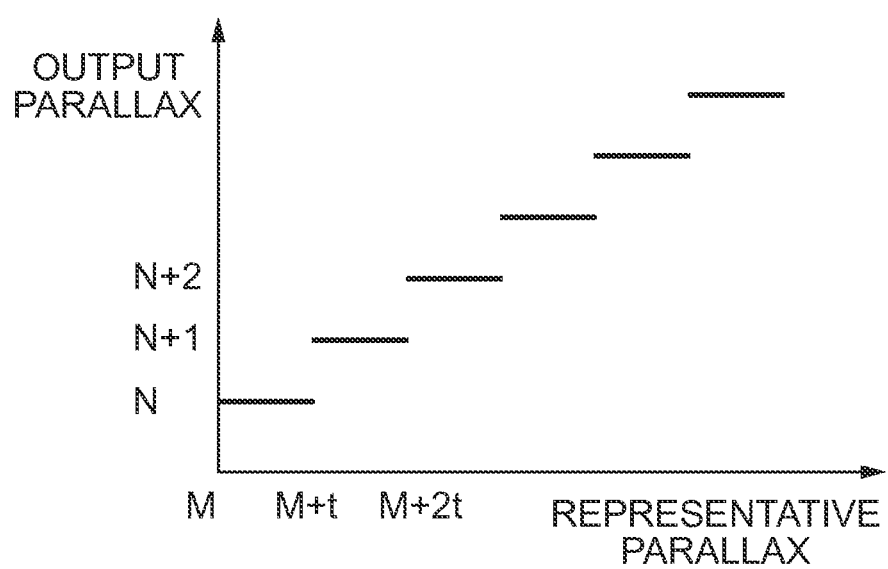
FIG. 6 is a diagram showing an example of a stereoscopic video representative parallax-output parallax conversion table.

In S16, the parallax adjustment unit 202 reads out a stereoscopic video parallax-output parallax conversion table stored in the ROM 61 or the like, to the SDRAM 39. FIG. 6 shows an example of the stereoscopic video parallax-output parallax conversion table. This table defines an integer output parallax corresponding to an arbitrary representative parallax for the stereoscopic image frames. In this table, for example, representative parallaxes of M to M+t correspond to an output parallax of N, and representative parallaxes of M+t to M+2t correspond to an output parallax of N+1. Here, since the minimum display unit of an image is 1 pixel, the output parallax in the pixel unit is shown as an integer.+

The parallax adjustment unit 202 determines the output parallax corresponding to the representative parallax (which includes the representative parallax after the shift or after the reduction) for each stereoscopic image frame, in accordance with the stereoscopic video parallax-output parallax conversion table stored in the ROM 61 or the like.

The display control unit 42 sequentially displays each stereoscopic image frame on the monitor 13 with the deter output parallax, and thereby, plays back the stereoscopic video.

Figure 7:
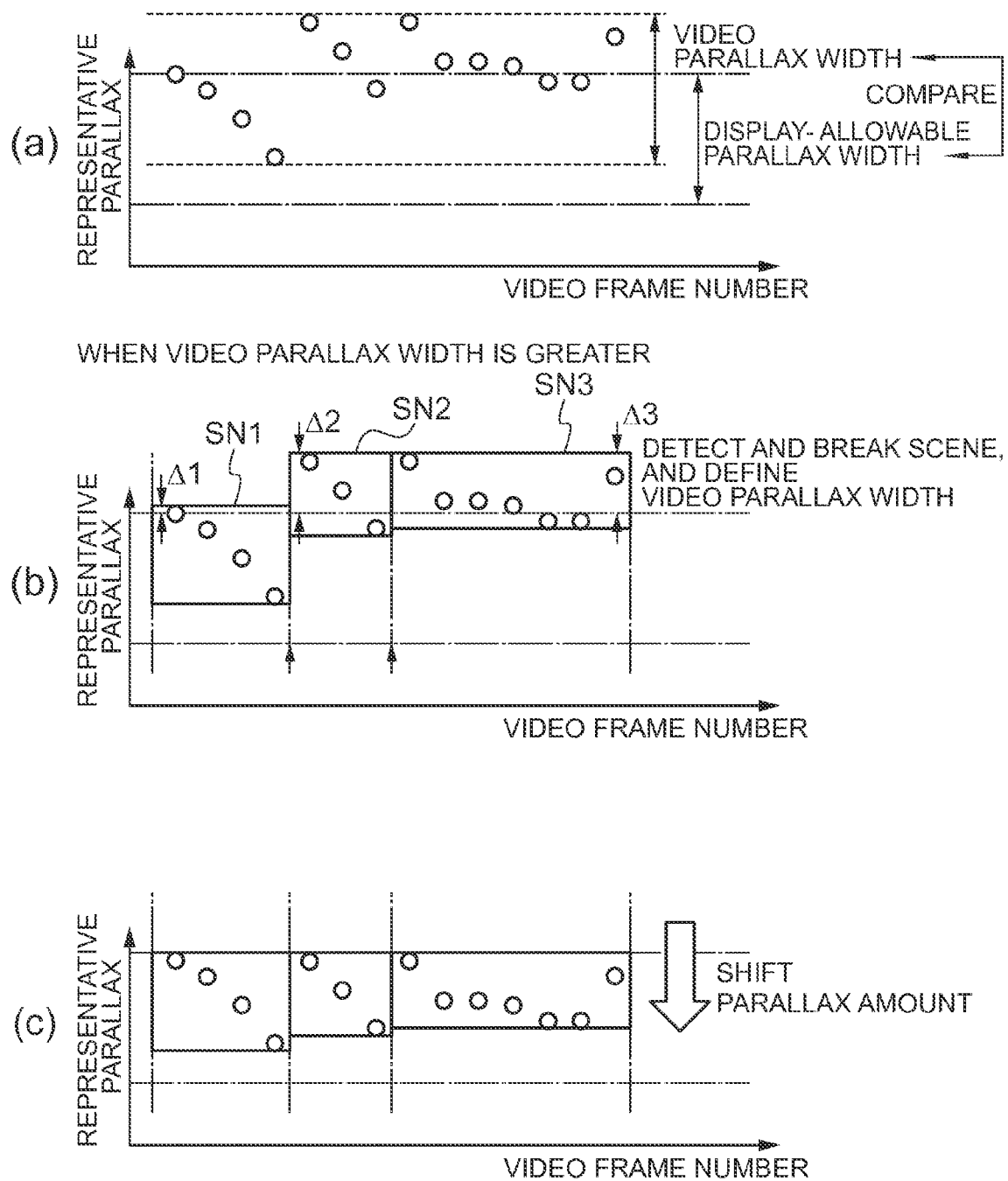
FIG. 7 is a schematic diagram of a parallax shift according to a first embodiment.

FIG. 7 illustrates a manner of the parallax width adjustment in the process.

For example, suppose that the video parallax width of a certain stereoscopic video exceeds the display-allowable parallax width, as shown in the (a) portion of FIG. 7. In this case, No is decided in S3, and the scene separation of this video is performed in S7. The (b) portion of FIG. 7 illustrates separated scenes. In this figure, the single stereoscopic video is separated into three scenes SN1 to SN3.

After the scene separation, in S8, the video parallax width for each scene is compared with the display-allowable parallax width. In the case where the video parallax width for a scene exceeds the display-allowable parallax width, No is decided in S8, the detection level of the scene change is altered in S13, and then the scene change is detected at the level after the alteration, again.

In the case where the video parallax width for a scene does not exceed the display-allowable parallax width, Yes is decided in S8, and the decision whether the representative parallax should be shifted for the scene is made in S9 and/or S10. In the case where the decision that the maximum parallax for the scene exceeds the maximum display-allowable parallax is made in S9, or where the decision that the minimum parallax for the scene falls below the minimum display-allowable parallax is made in S10, the representative parallax for each stereoscopic image frame contained in the scene is shifted so as to fall within the range of the minimum value to maximum value of the display-allowable parallax, in S11.

The (c) portion of FIG. 7 illustrates the shift of the representative parallax for each separated scene. In this figure, the representative parallaxes for the scene SN1 are uniformly shifted downward by Δ1, the representative parallaxes for the scene SN2 are uniformly shifted downward by Δ2, and the representative parallaxes for the scene SN3 are uniformly shifted downward by Δ3.

Figure 8:
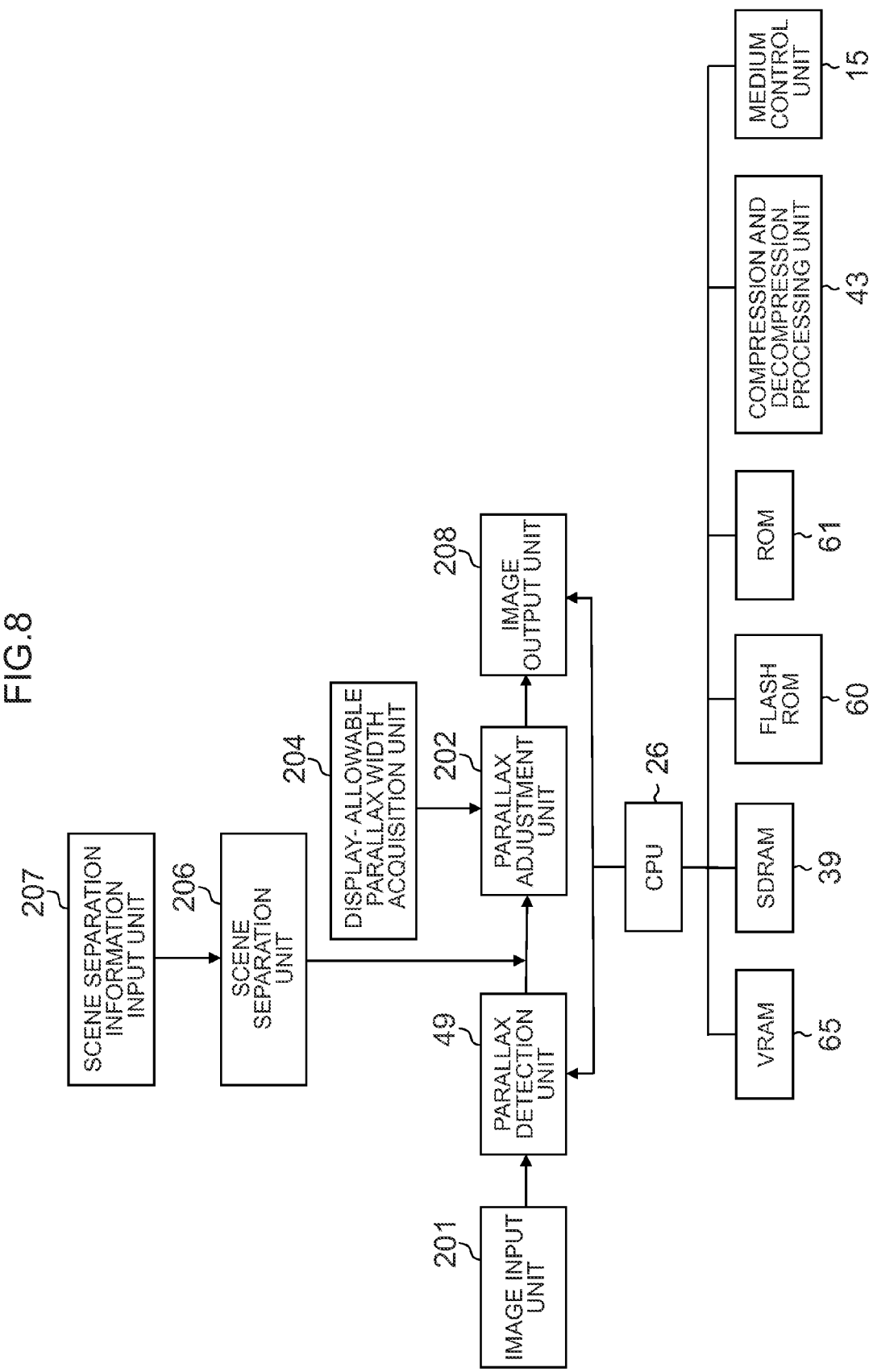
FIG. 8 is a schematic diagram of a parallax shift according to a second embodiment.

The blocks necessary for executing the above process may be included in an electronic device other than the digital camera. For example, as shown in FIG. 8, this process can be executed by an image processing device including blocks for displaying a planar or stereoscopic image, such as the CPU 26, the VRAM 65, the SDRAM 39, the flash ROM 60, the ROM 61, the compression and decompression processing unit 43, the medium control unit 15, the parallax detection unit 49, the parallax adjustment unit 202, an image input unit 201 (for example, the image input controller 38, the medium control unit 15 and the like), the display-allowable parallax width acquisition unit 204, the scene separation unit 206, the scene separation information input unit 207, and the image output unit 208 (for example, the monitor 13, the medium control unit 15 and the like).

A stereoscopic video to be input by the image input unit 201 is not limited to a stereoscopic video directly output from the imaging means, and for example, may be a stereoscopic video that the medium control unit 15 reads from a medium such as the memory card 16, or that is received through a network.

The destination to which the image output unit 208 outputs an image after the parallax adjustment completion is not limited to the display control unit 42 and the monitor 13, and the image does not need to be displayed promptly after the parallax adjustment. For example, the medium control unit 15 may store the adjusted representative parallax for each stereoscopic image frame, that is, the output parallax, a medium such as the memory card 16, as stereoscopic video data associated with each stereoscopic image frame. Alternatively, the stereoscopic video data may be sent through a network. Alternatively, each stereoscopic image frame can be printed as a printed matter such as a lenticular print.

Also, the mode setting of whether the parallax adjustment process is operated, and the timing therefor are arbitrary. For example, when the image taking mode is started, the parallax adjustment process is not performed, and after a full-push of the release button 14 is performed, the parallax adjustment is started. Alternatively, when stereoscopic video data of the memory card 16 are displayed on the external monitor 13 such as a television, the parallax adjustment is started.

By the above process, in the case where the representative parallax for each stereoscopic image frame exceeds the display-allowable parallax width, whether the parallax width should be compressed is decided for each scene, and the parallax width is adjusted on a scene basis. Therefore, the representative parallax at the time of taking the stereoscopic video can be kept and output.

In particular, in the case of pmax=MAX (maxk) and pmin=MIN (mink), the range of the maximum to minimum of parallaxes that an observer is likely to perceive is adjusted to the display-allowable parallax width, leading to a further reduction in the likelihood of giving feeling of fatigue.

Here, the above parallax adjustment process can be executed for each of the different kinds of representative parallaxes. In this case, there may a possibility that the parallax adjustment results are not consistent among the different kinds of representative parallaxes. On this occasion, a result appropriate for an observer may be selected and executed, or the parallax adjustment and the parallax width adjustment may be cancelled.

For example, suppose that, in one arbitrary frame, the maximum value of the parallaxes on the background side relative to the cross point is a first maximum representative parallax, the minimum value of the parallaxes on the background side relative to the cross point is a first minimum representative parallax, the maximum value of the parallaxes on the foreground side relative to the cross point is a second maximum representative parallax, and the minimum value of the parallaxes on the foreground side relative to the cross point is a second minimum representative parallax, and that the parallax adjustment process is performed for the first maximum and minimum representative parallaxes, and further, the parallax adjustment process is performed for the second maximum and minimum representative parallaxes.

Then, for example, suppose that, for the video parallax width (second video parallax width) for a scene S(k) that is determined by the second maximum and minimum representative parallaxes, YES is decided in S8, but for the video parallax width (first video parallax width) for the scene S(k) that is determined by the first maximum and minimum representative parallaxes, NO is decided in S8, NO is decided in S12 to proceed to S14 and the parallax adjustment is performed in S14. In this case, the process returns to S1 again, and the second maximum and minimum representative parallaxes and the second video parallax width are calculated from the scene S(k) after the parallax adjustment. In the case where NO is decided in S8 for the second video parallax width for the scene S(k) after the parallax adjustment, the parallax adjustment may be canceled, and the state before the parallax adjustment of the video is performed may be restored. The same can be performed in the case where YES is decided in S8 for the first video parallax width but NO is decided in S8 for the second video parallax width. This allows the parallax adjustment on the background side and the parallax adjustment on the foreground side to be consistent.

Second Embodiment

When the parallax amount is adjusted for each scene, there is a probability that a variation in the output parallax involved in a change in scene is different from a variation in the original parallax at the time of taking an image and a viewer has an uncomfortable feeling. Hence, in S11, for the immediately previous scene S(k−1) and the current scene S(k) (here, 2<k≤n), the parallax adjustment unit 202 may further decide whether both of the parallax widths for the scenes S(k−1) and S(k) do not exceed the display-allowable parallax width, and may shift the scene S(k) to the display-allowable parallax width by a common shift amount with the scene S(k−1), in the case of deciding that both of the parallax widths for the scenes S(k−1) and S(k) do not exceed the display-allowable parallax width. This process is repeated with the increment of k. If all the video parallax widths for two or more successive scenes do not exceed the display-allowable parallax width, those two or more scenes are shifted upward or downward by a common shift amount, so as to fall within the range of the display-allowable parallax.

Figure 9:
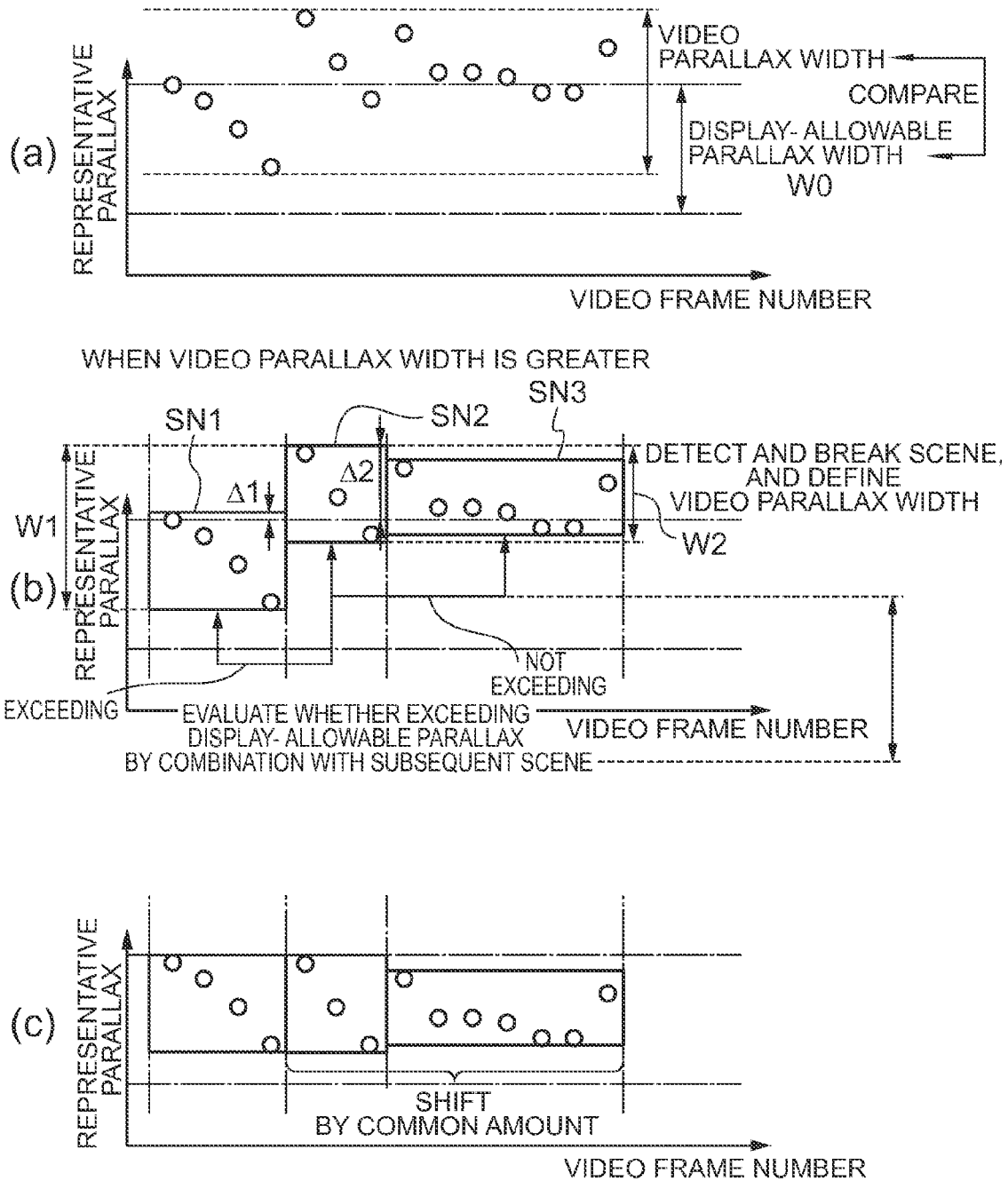
FIG. 9 is a block diagram of a display playback device.

For example, suppose that the representative parallaxes for the stereoscopic frames in a certain stereoscopic video fluctuate as shown in the (a) portion of FIG. 9. The (b) portion of FIG. 9 illustrates scenes separated from this stereoscopic video. In this figure, the single stereoscopic video is separated into three scenes SN1 to SN3.

A parallax width W1 for two scenes SN1 and SN2 exceeds a display-allowable parallax width W0. On the other hand, a parallax width W2 for two scenes SN2 and SN3 do not exceed the display-allowable parallax width W0. In this case, the decision whether the representative parallax should be shifted is made for the two scenes SN2 and SN3, in S9 and/or S10. In the case where the decision that the maximum parallax for the scenes exceeds the maximum display-allowable parallax is made in S9, or where the decision that the minimum parallax for the scenes falls below the minimum display-allowable parallax is made in S10, the representative parallax for each stereoscopic image frame contained in the two scenes SN2 and SN3 is shifted so as to fall within the display-allowable parallax width, in S11.

The (c) portion of FIG. 9 illustrates the shift of the representative parallax for each separated scene. In this figure, the representative parallaxes for the scene SN1 are uniformly shifted downward by Δ1, and the representative parallaxes for the scenes SN2 and SN3 are both shifted downward by Δ2.

Thus, in the case where the parallax width of the representative parallaxes for successive scenes falls within the display-allowable parallax width, by setting the shift amount of the representative parallaxes for those scenes to a common value, the transition of the parallaxes before and after the scene change becomes the same as that at the time of taking the image, resulting in a stereoscopic image that is easy for a viewer to view.

Third Embodiment

In the first and second embodiments, when contiguous scenes are greatly different in the adjustment amount of the representative parallax (the variation amount of the representative parallax by the parallax width reduction and/or the variation amount of the representative parallax by the shift), there is a high probability that the distance to a subject suddenly changes at the time of the scene change between the scenes. Hence, in the case where the difference of the adjustment amount of the representative parallax between the scenes is greater than or equal to a predetermined threshold value, a smoothing may be performed for the adjustment amounts of the representative parallaxes between the scenes.

Concretely, suppose that a scene A and a scene B are temporally contiguous, the adjustment amount of the representative parallaxes for the scene A is a, and the adjustment amount of the representative parallaxes for the scene B is b. The parallax adjustment unit 202 decides whether |a−b|<a predetermined threshold value (for example, 5 pixels) holds. In the case of No, the parallax adjustment unit 202 performs a smoothing of the adjustment amount a of the representative parallax for the scene A and the adjustment amount b of the representative parallax for the scene B, in a predetermined range.

For example, the parallax adjustment unit 202 gradually alters the parallax adjustment amount from a to b, from the stereoscopic image frame at the start of the scene B to a stereoscopic image frame after about 100 frames. Alternatively, the parallax adjustment unit 202 gradually alters the parallax adjustment amount from a to b, from a stereoscopic image frame about 50 frames before the end of the scene A to a stereoscopic image frame about 50 frames after the start of the scene B. Thereby, it is possible to ease a sudden change in the parallax adjustment amount involved in the scene change. Here, the alteration in the parallax adjustment amount between the scenes may be performed in accordance with a predetermined function that adopts a time axis as a parameter, for example, a linear function.

What is claimed is:

1. An image processing device comprising:
a representative parallax detection device configured to acquire representative parallaxes for respective stereoscopic image frames constituting a whole or predetermined partial range of a stereoscopic video;
a scene separation processing device configured to process the stereoscopic video so as to separate the stereoscopic video into multiple scenes, when a parallax width does not comply with an allowable parallax width, the parallax width being defined by a maximum value and a minimum value of the representative parallaxes for the respective stereoscopic image frames acquired by the representative parallax detection device, the allowable parallax width being defined by a previously determined maximum allowable parallax and a minimum allowable parallax;
a parallax adjustment processing device configured to process data of the parallax width so as to decide whether a scene parallax width complies with the allowable parallax width, for each of the scenes separated by the scene separation processing device, and, in response to the decision result, uniformly adjust the representative parallaxes for the respective stereoscopic image frames constituting the scene such that the scene parallax width complies with the allowable parallax width, the scene parallax width being defined by a maximum value and a minimum value of the representative parallaxes for the respective stereoscopic image frames constituting the scene; and
an output device configured to output data representing the stereoscopic image frames whose representative parallaxes are adjusted by the parallax adjustment processing device,
wherein the representative parallaxes for the respective stereoscopic image frames include a statistical operation value to be calculated based on parallaxes that, of parallaxes for the stereoscopic image frames, meet a predetermined condition, and
wherein
the statistical operation value includes at least one of an average value, a maximum value, a minimum value, a mode value and a median value of the parallaxes for the stereoscopic image frame, and
the representative parallaxes for the respective stereoscopic image frames include at least one of an average value, a maximum value, a minimum value, a mode value and a median value of parallaxes for a subject present on a background side or parallaxes for a subject present on a foreground side, among the parallaxes for the stereoscopic image frame, the background side being a side in a direction farther from an imaging device than a cross point, and the foreground side being a side in a direction closer to the imaging device than the cross point.

2. The image processing device according to claim 1, wherein, when the scene parallax width for a certain scene complies with the allowable parallax width but the maximum value of the representative parallaxes for the respective stereoscopic image frames constituting the scene is higher than a previously determined upper limit of the representative parallaxes, the parallax adjustment processing device adjusts the representative parallaxes for the respective stereoscopic image frames constituting the scene such that the representative parallaxes fall below the upper limit of the representative parallaxes.

3. The image processing device according to claim 2, wherein, when each scene parallax width corresponding to two or more successive scenes complies with the allowable parallax width but the maximum value of the representative parallaxes for the respective stereoscopic image frames constituting the two or more successive scenes is higher than the upper limit of the representative parallaxes, the parallax adjustment processing device uniformly adjusts the representative parallaxes for the respective stereoscopic image frames constituting the two or more successive scenes such that the representative parallaxes fall below the upper limit of the representative parallaxes.

4. The image processing device according to claim 1,
wherein, when the scene parallax width for a certain scene complies with the allowable parallax width but the minimum value of the representative parallaxes for the respective stereoscopic image frames constituting the scene falls below a previously determined lower limit of the representative parallaxes, the parallax adjustment processing device adjusts the representative parallaxes for the respective stereoscopic image frames constituting the scene such that the representative parallaxes are higher than the lower limit of the representative parallaxes.

5. The image processing device according to claim 4,
wherein, when each scene parallax width corresponding to two or more successive scenes complies with the allowable parallax width but the minimum value of the representative parallaxes for the respective stereoscopic image frames constituting the two or more successive scenes falls below the lower limit of the representative parallaxes, the parallax adjustment processing device uniformly adjusts the representative parallaxes for the respective stereoscopic image frames constituting the two or more successive scenes such that the representative parallaxes are higher than the lower limit of the representative parallaxes.

6. The image processing device according to claim 1,
wherein, when the scene parallax width for a scene separated in accordance with a first predetermined criterion does not comply with the allowable parallax width, the scene separation processing device separates the stereoscopic video in accordance with the first predetermined criterion and a second criterion that is different from the first predetermined criterion.

7. The image processing device according to claim 6,
wherein the second criterion has a lower estimation accuracy for a change in the scene than the first criterion.

8. The image processing device according to claim 6,
wherein, for each of the scenes separated in accordance with the first criterion and the second criterion by the scene separation processing device, the parallax adjustment processing device decides whether the scene parallax width for the scene complies with the allowable parallax width, and adjusts the representative parallaxes for the respective stereoscopic image frames constituting the scene such that the scene parallax width complies with the allowable parallax width, when deciding that the scene parallax width for the scene does not comply with the allowable parallax width.

9. The image processing device according to claim 1,
wherein, when a difference of adjustment amounts of the representative parallaxes between two contiguous scenes exceeds a predetermined threshold value, the parallax adjustment processing device performs a smoothing of the adjustment amounts of the representative parallaxes between the two contiguous scenes.

10. The image processing device according to claim 1,
wherein the parallaxes that meet the predetermined condition include a parallax for a gazing position to the stereoscopic image frame.

11. The image processing device according to claim 10,
wherein the gazing position includes a gazing point of a viewer of the stereoscopic image frame, a gazing point of a videographer of the stereoscopic image frame, or an arbitrary designated gazing point in the stereoscopic image frame.

12. The image processing device according to claim 1,
wherein the parallaxes that meet the predetermined condition include parallaxes for a face area, parallaxes for a focusing evaluation value calculation area, parallaxes for a central image area, parallaxes for a subject present on a background side among the parallaxes for the stereoscopic image frame, or parallaxes for a subject present on a foreground side among the parallaxes for the stereoscopic image frame, the background side being a side in a direction farther from an imaging device than a cross point, and the foreground side being a side in a direction closer to the imaging device than the cross point.

13. The image processing device according to claim 1,
wherein the representative parallaxes for the respective stereoscopic image frames include both a first representative parallax and a second representative parallax, the first representative parallax being a maximum value of the parallaxes that, of the parallaxes for the stereoscopic image frame, meet the predetermined condition, and the second representative parallax being a minimum value of the parallaxes that, of the parallaxes for the stereoscopic image frame, meet the predetermined condition, and the scene separation processing device separates the stereoscopic video into the multiple scenes, when the parallax width defined by the maximum value of the first representative parallax and the minimum value of the second representative parallax does not comply with the allowable parallax width defined by the previously determined maximum allowable parallax and the minimum allowable parallax.

14. An image processing method to be executed in an image processing device including processing circuitry that performs a representative parallax acquisition, a scene separation, a parallax adjustment and data output, the image processing method comprising:

acquiring representative parallaxes for respective stereoscopic image frames constituting a whole or predetermined partial range of a stereoscopic video;

performing scene separation by separating the stereoscopic video into multiple scenes, when a parallax width does not comply with an allowable parallax width, the parallax width being defined by a maximum value and a minimum value of the representative parallaxes for the respective stereoscopic image frames acquired by the acquiring step, and the allowable parallax width being defined by a previously determined maximum allowable parallax and a minimum allowable parallax;

deciding whether a scene parallax width complies with the allowable parallax width, for each of the scenes separated by the step of performing scene separation, and, in response to the decision result, uniformly adjusting the representative parallaxes for the respective stereoscopic image frames constituting the scene such that the scene parallax width complies with the allowable parallax width, the scene parallax width being defined by a maximum value and a minimum value of the representative parallaxes for the respective stereoscopic image frames constituting the scene; and outputting the stereoscopic image frames whose representative parallaxes are adjusted by the step of uniformly adjusting the representative parallaxes, wherein the representative parallaxes for the respective stereoscopic image frames include a statistical operation value to be calculated based on parallaxes that, of parallaxes for the stereoscopic image frames, meet a predetermined condition, and wherein
the statistical operation value includes at least one of an average value, a maximum value, a minimum value, a mode value and a median value of the parallaxes for the stereoscopic image frame, and
the representative parallaxes for the respective stereoscopic image frames include at least one of an average value, a maximum value, a minimum value, a mode value and a median value of parallaxes for a subject present on a background side or parallaxes for a subject present on a foreground side, among the parallaxes for the stereoscopic image frame, the background side being a side in a direction farther from an imaging device than a cross point, and the foreground side being a side in a direction closer to the imaging device than the cross point.

15. A non-transitory computer-readable recording medium having an image processing program to be executed in an image processing device including processing circuitry that includes a representative parallax detection device, a scene separation processing device, a parallax adjustment processing device and an output device, the image processing program when executed causes the image processing device to perform the steps of:
acquiring representative parallaxes for respective multiple stereoscopic image frames constituting a whole or predetermined partial range of a stereoscopic video;
separating the stereoscopic video into multiple scenes, when a parallax width does not comply with an allowable parallax width, the parallax width being defined by a maximum value and a minimum value of the representative parallaxes for the respective stereoscopic image frames acquired by the step of acquiring representative parallaxes, and the allowable parallax width being defined by a previously determined maximum allowable parallax and a minimum allowable parallax;
deciding whether a scene parallax width complies with the allowable parallax width, for each of the scenes separated by the separating step, and,
in response to the decision result, uniformly adjusting the representative parallaxes for the respective stereoscopic image frames constituting the scene such that the scene parallax width complies with the allowable parallax width, the scene parallax width being defined by a maximum value and a minimum value of the representative parallaxes for the respective stereoscopic image frames constituting the scene; and
outputting the stereoscopic image frames whose representative parallaxes are adjusted by the step of uniformly adjusting the representative parallaxes,
wherein the representative parallaxes for the respective stereoscopic image frames include a statistical operation value to be calculated based on parallaxes that, of parallaxes for the stereoscopic image frames, meet a predetermined condition, and
wherein
the statistical operation value includes at least one of an average value, a maximum value, a minimum value, a mode value and a median value of the parallaxes for the stereoscopic image frame, and
the representative parallaxes for the respective stereoscopic image frames include at least one of an average value, a maximum value, a minimum value, a mode value and a median value of parallaxes for a subject present on a background side or parallaxes for a subject present on a foreground side, among the parallaxes for the stereoscopic image frame, the background side being a side in a direction farther from an imaging device than a cross point, and the foreground side being a side in a direction closer to the imaging device than the cross point.

* * * * *